US011478053B2

(12) United States Patent
Keilany

(10) Patent No.: US 11,478,053 B2
(45) Date of Patent: Oct. 25, 2022

(54) RELATING TO ORGANIC MATERIAL

(71) Applicant: Lidan Limited, Richmond (GB)

(72) Inventor: Nader El Keilany, Richmond (GB)

(73) Assignee: Lidan Limited, Richmond (GB)

( * ) Notice: Subject to any disclaimer, the term of this patent is extended or adjusted under 35 U.S.C. 154(b) by 0 days.

(21) Appl. No.: 16/638,916

(22) PCT Filed: Aug. 14, 2018

(86) PCT No.: PCT/EP2018/072063
§ 371 (c)(1),
(2) Date: Feb. 13, 2020

(87) PCT Pub. No.: WO2019/034667
PCT Pub. Date: Feb. 21, 2019

(65) Prior Publication Data
US 2020/0214409 A1   Jul. 9, 2020

(30) Foreign Application Priority Data
Aug. 14, 2017  (GB) ...................................... 1712989

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/003* (2013.01)

(58) Field of Classification Search
CPC .... H04M 1/23; H04M 1/0247; H04M 1/7246; H04M 1/02; H04M 1/0214; H04M 1/03; H04M 1/21; H04M 1/72409; G06F 2200/1633; H04B 1/3888; H04B 1/3877; H04B 1/3827; H04B 1/3833; A45C 11/00; A45C 2011/003; A45C 13/08; A45C 2011/002; B60R 11/0252; H05K 5/0247; H05K 2201/1031; H05K 2201/10371;
(Continued)

(56) References Cited

U.S. PATENT DOCUMENTS

D674,798 S * 1/2013 Kim .............................. D14/440
8,917,506 B2 * 12/2014 Diebel ................ H04M 1/0262
361/679.41
(Continued)

FOREIGN PATENT DOCUMENTS

JP          3180750 U       1/2013
KR     20110014295 A       2/2011
(Continued)

OTHER PUBLICATIONS

PCT International Search Report for PCT/EP2018/072063.
(Continued)

*Primary Examiner* — Lana N Le
(74) *Attorney, Agent, or Firm* — DuFault Law Firm, P.C.; Dustin R. DuFault

(57) ABSTRACT

The invention provides a cover for a tablet computer having a decorative frame suitable for being arranged on a front side of the tablet computer wherein the decorative frame forms a plurality of connectors for receiving one or more replaceable decorative elements; and one or more replaceable decorative elements each having at least one corresponding connector.

10 Claims, 8 Drawing Sheets

(58) Field of Classification Search
CPC ...... H05K 5/00; H05K 5/0004; H05K 3/3405; H05K 5/03; H05K 9/0024; H05K 9/0062; H05K 3/284; F16B 21/02; F16B 7/22; H01R 13/4538
USPC ............. 455/575.1, 575.8, 556.1–556.2, 557
See application file for complete search history.

(56) References Cited

U.S. PATENT DOCUMENTS

| | | | |
|---|---|---|---|
| 9,532,633 | B1 | 1/2017 | Tan et al. |
| 9,953,362 | B2* | 4/2018 | Argue ..................... B62B 3/142 |
| 10,348,353 | B2* | 7/2019 | Weaver ............... H04M 1/0279 |
| 11,086,364 | B2* | 8/2021 | Yamazaki ............. G06F 1/1654 |
| 2003/0224831 | A1* | 12/2003 | Engstrom ............ H04B 1/3838 |
| | | | 455/575.8 |
| 2008/0139012 | A1* | 6/2008 | Saiki .................... H01R 12/716 |
| | | | 439/65 |
| 2011/0049005 | A1* | 3/2011 | Wilson ...................... B44C 1/16 |
| | | | 206/701 |
| 2012/0261289 | A1* | 10/2012 | Wyner ................... A45C 11/00 |
| | | | 206/320 |
| 2012/0274195 | A1* | 11/2012 | Thompson ............ G06F 1/1613 |
| | | | 312/237 |
| 2012/0314354 | A1* | 12/2012 | Rayner ................... H04M 1/18 |
| | | | 361/679.01 |
| 2013/0148270 | A1* | 6/2013 | Fujioka .................. F16M 11/22 |
| | | | 361/679.01 |
| 2013/0222991 | A1* | 8/2013 | McWilliams ......... G06F 1/1632 |
| | | | 361/679.4 |
| 2014/0375186 | A1 | 12/2014 | Tarnow et al. |
| 2015/0151515 | A1* | 6/2015 | Skepton ................ G06F 1/1628 |
| | | | 428/354 |
| 2016/0066460 | A1* | 3/2016 | Rayner .................. A45C 11/00 |
| | | | 224/191 |
| 2016/0249489 | A1* | 8/2016 | Wakana ............... H01R 12/721 |
| 2016/0286025 | A1* | 9/2016 | Elgrissy ............... H04B 1/3888 |
| 2016/0298307 | A1* | 10/2016 | Doyle ..................... E02B 3/068 |
| 2017/0201286 | A1* | 7/2017 | Qian .................... H04B 1/3877 |
| 2018/0047318 | A1* | 2/2018 | Nakamura .............. G09F 19/12 |
| 2018/0168303 | A1* | 6/2018 | Marks .................. G06F 1/1626 |
| 2019/0192075 | A1* | 6/2019 | Kranz .................... A61B 5/339 |
| 2019/0289972 | A1* | 9/2019 | Lombardo ............. A45C 11/00 |

FOREIGN PATENT DOCUMENTS

| | | |
|---|---|---|
| KR | 101220507 B1 | 1/2013 |
| KR | 20130001364 U | 2/2013 |
| WO | 2014208905 A1 | 12/2014 |

OTHER PUBLICATIONS

Combined Search and Examination Report dated Sep. 18, 2017 in GB1712989.1.
Examination Report dated Jul. 10, 2018 in GB1712989.1.
Examination Report dated Sep. 18, 2018 in GB1712989.1.
Examination Report dated Feb. 13, 2019 in GB1712989.1.
Examination Report dated Jun. 6, 2019 in GB1712989.1.
Cite: Tinkerbrick (https://newatlas.com/tinkerbrick-case-iphone-ipod-lego/25344/).
Cite: YT1 (https://www.youtube.com/watch?v=s5F7H4lqiz0).

* cited by examiner

RELATING TO ORGANIC MATERIAL

The present invention relates to a personalised cover for a computer.

Increasingly, young people such as children, teenagers, and young adults are using computers, particularly tablet computers during their education. These computers need covers to protect them from everyday wear and tear. Typically, such covers are personalised by a young person Meanwhile, a computer may last for 4-5 years during which time a child or young adult will grow up considerably and their tastes and interests will change. Accordingly, there is a need for a cover which can be personalised and modified during the lifetime of the computer such that the personalisation may be changed to suit the changing tastes of the young person.

A way of ameliorating these problems has been sought.

According to the invention there is provided a cover for a tablet computer having a decorative frame suitable for being arranged on a front side of the tablet computer wherein the decorative frame forms a plurality of connectors for receiving one or more replaceable decorative elements; and one or more replaceable decorative elements each having at least one corresponding connector.

Advantages of the invention include that the one or more decorative elements may be replaced such that the decorative effect of the decorative frame of the cover may be changed or updated.

In some embodiments, the cover may have an outer decorative frame for decoration and an inner frame for resiliently engaging an outer edge of tablet computer. In some embodiments, the tablet computer may have a screen and the front decorative frame may be arranged around the screen of the tablet computer. In some embodiments, the one or more decorative elements do not interfere with the functioning of the tablet computer.

In some embodiments, the decorative frame may have an outer edge and the plurality of connectors may be arranged to be approximately equidistant between the inner frame and the outer edge. In some embodiments, the plurality of connectors may be substantially narrower in diameter than the distance between the inner frame 14 and the outer edge such that the female connectors cover part of that distance, for example about one quarter to one third of that distance.

In some embodiments, the plurality of connectors may be female connectors, interlocking mechanical connectors and/or magnetic connectors. In some embodiments, the cover may have one or more formations for engaging with a button on the tablet computer.

In some embodiments, the cover may have a rear decorative panel in which are formed a plurality of connectors for receiving one or more replaceable decorative elements. In some embodiments, the rear decorative panel may form an opening for a rear camera of the tablet computer.

In some embodiments, the cover may have a rear protective panel. In some embodiments, the rear decorative panel may form an opening for a rear camera of the tablet computer. In some embodiments, the cover may have a front protective panel which may optionally be hinged. In some embodiments, the cover may form an aperture so as to allow access to a socket or switch on the tablet computer.

In some embodiments, a decorative element may comprise a decorative head mounted on at least one connector. In some embodiments, the decorative head may be decorated with a letter, symbol, cute animal, plain colour, a nation's flag, clip art, an image of a character from popular culture (such as a film or cartoon character, a singer and/or an actor) and/or with a three-dimensional shape such as synthetic flowers petals and/or a small 3D animal statue. In some embodiments, the at least one connector may be a male connector, an interlocking mechanical connector and/or a magnetic connector, to correspond with the plurality of connectors on the cover. In some embodiments, the at least one connector may be a male connector with a shoulder for resiliently engaging the female connector.

In some embodiments, the decorative element may have a square, rectangular or abstract shape (such as a figurative shape) with a connector provided at each extremity (such as a corner of a square or rectangular shape).

The invention will now be illustrated with reference to the following Figures of the accompanying drawings which are not intended to limit the scope of the claimed invention:

Figure 1:
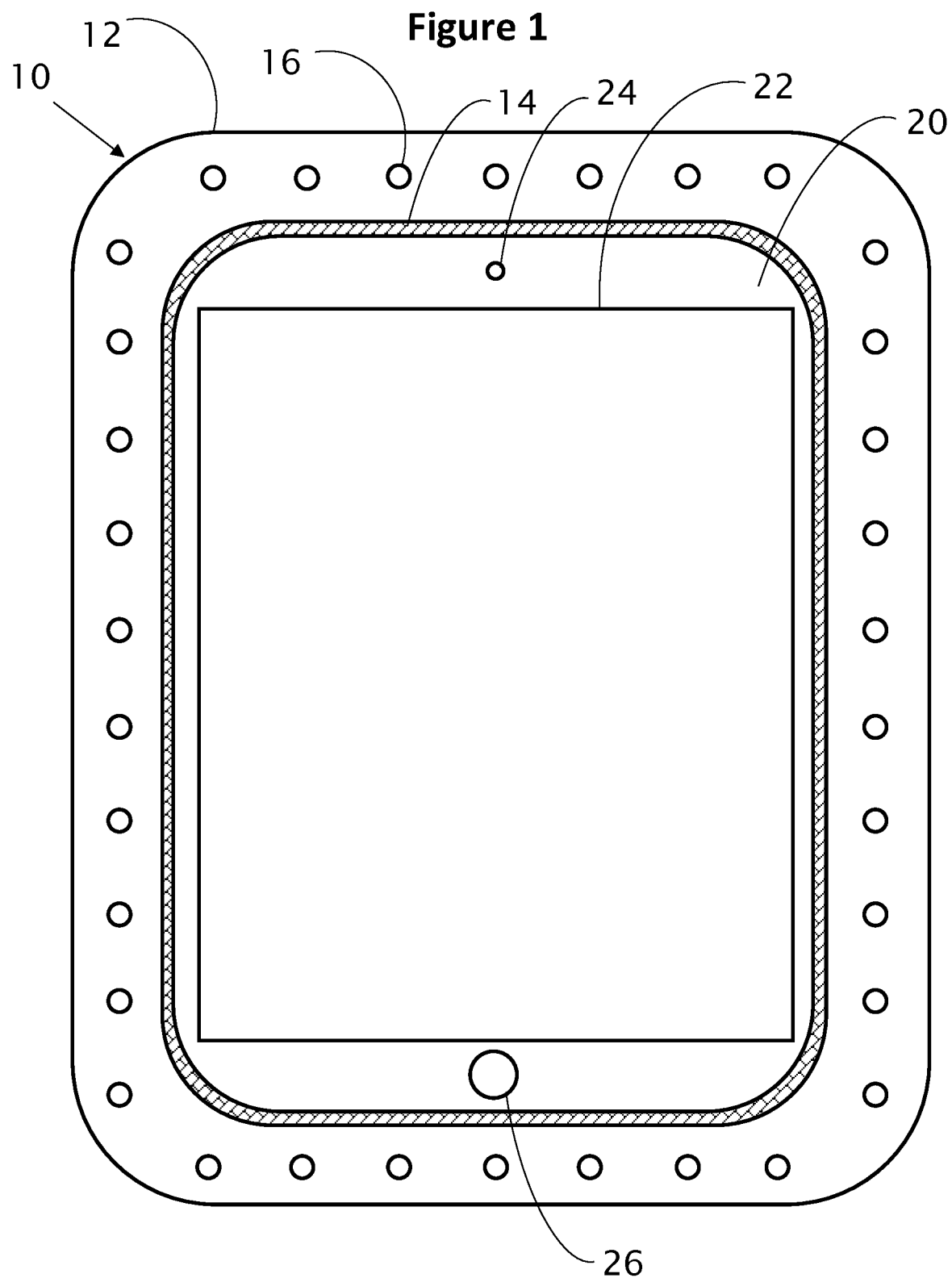
FIG. 1 shows a schematic plan view of a front side of a first embodiment of a cover according to the invention.
Figure 2:
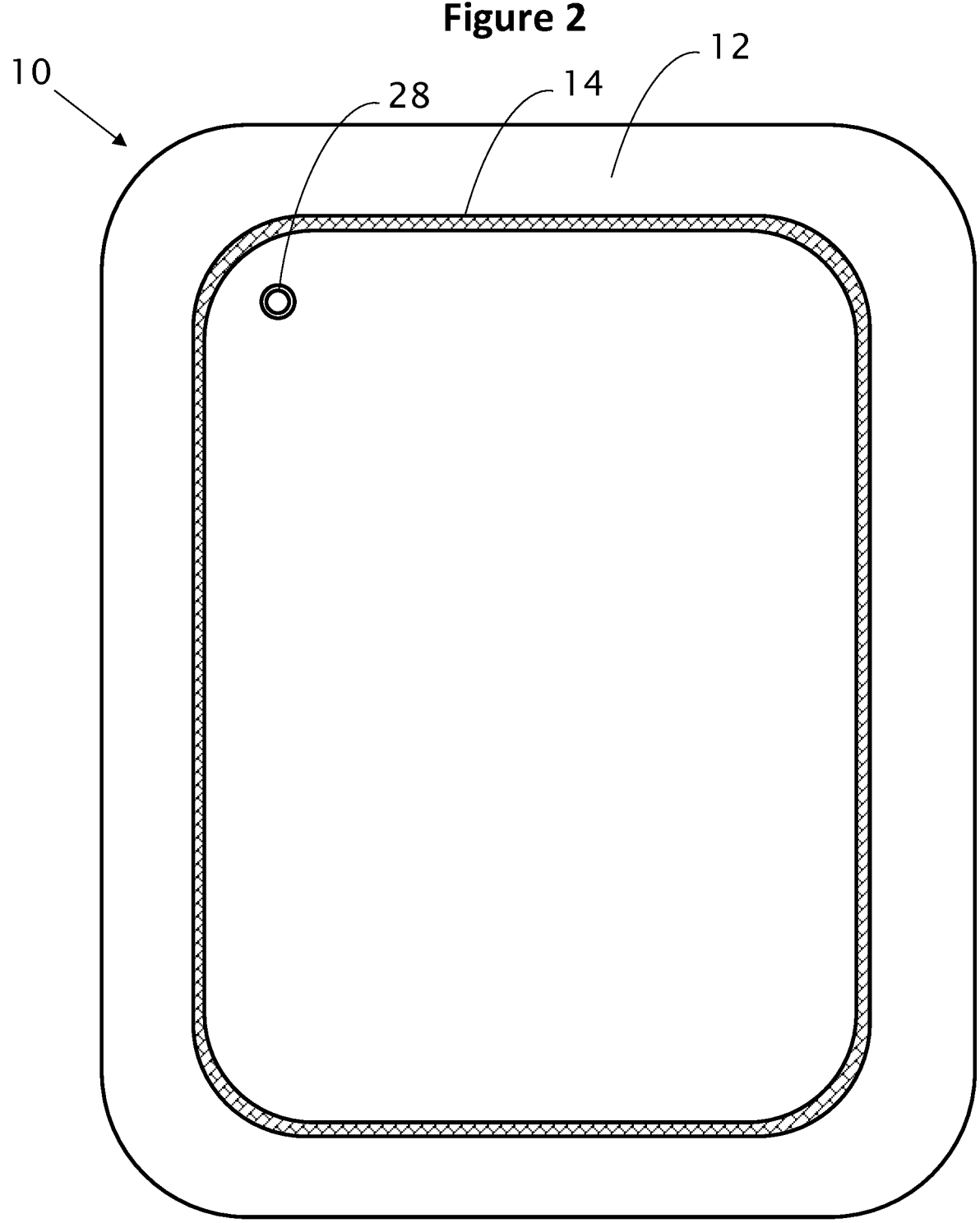
FIG. 2 shows a schematic plan view of a rear side of the first embodiment of a cover according to the invention.

The cover according to the first embodiment of the invention is indicated generally at 10 on FIGS. 1, 2, 4 and 7 of the drawings. Cover 10 has an outer decorative frame 12 for decoration and an inner frame 14 for resiliently engaging an outer edge of tablet computer 20. Outer decorative frame 12 may have a height which is approximately the same as the thickness of a tablet computer 20 and a width of about 2 cm where a decorative element 30 has a diameter of about 1.5 cm. Tablet computer 20 has a screen 22, a front camera 24, a control button 26 and a rear camera 28. Tablet computer 20 has a front side on which the screen 22, front camera 24, and control button 26 are provided. Cover 10 is arranged around the perimeter of the tablet computer 20 such that outer decorative frame 12 is presented on the front side of the tablet computer 20.

Figure 10:
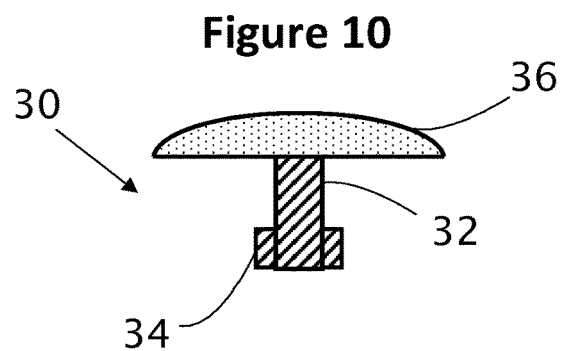
FIG. 10 shows a schematic cross-sectional view of a first embodiment of a decorative element according to the invention.

A plurality of female connectors 16 are formed in outer decorative frame 12 which female connectors 16 are each shaped for receiving a male connector 32 of a decorative element 30 according to the first embodiment of the invention as shown in FIG. 10. The plurality of female connectors 16 are provided on the front side of outer decorative frame 12 such that a user of the tablet computer 20 may see the decorative elements 30. For example, outer decorative frame 12 may form seven female connectors 16 along its top and bottom frame parts and ten female connectors 16 along the left-hand and right-hand edge frame parts. Cover 10 may have one or more formations (not shown) on its outer edge 19 which engage with a button on the tablet computer 20 such as a power button, a volume control button etc. The plurality of female connectors 16 are positioned on the outer decorative frame 12 such that the decorative elements 30 do not interfere with the functioning of the tablet computer 20, e.g. such that they do not overlap the screen 22.

The outer decorative frame 12 has an outer edge and the female connectors 16 are arranged to be approximately equidistant between inner frame 14 and the outer edge. The female connectors 16 are substantially narrower in diameter than the distance between the inner frame 14 and the outer edge such that the female connectors cover part of that distance, for example about one quarter to one third of that distance.

Figure 3:
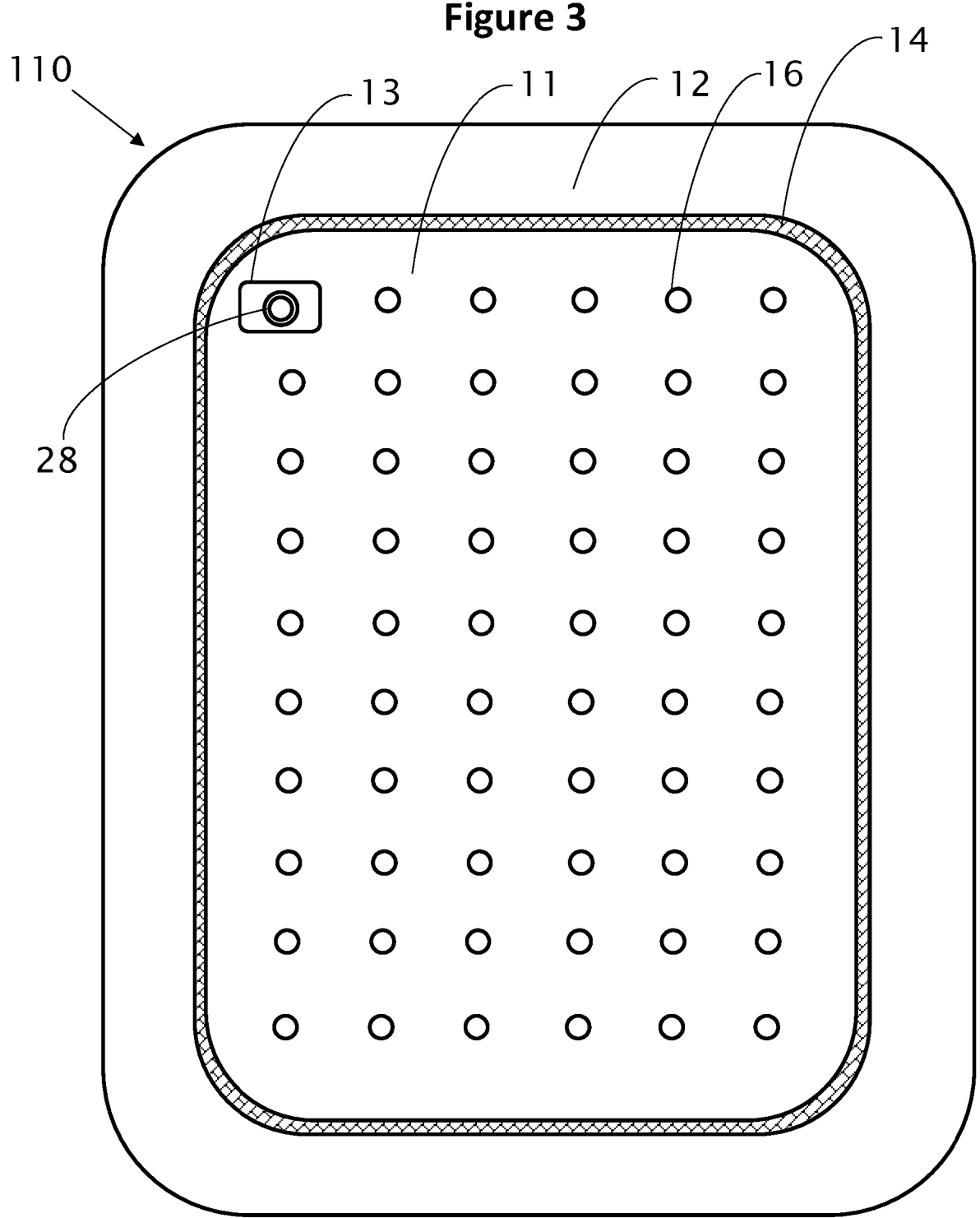
FIG. 3 shows a schematic plan view of a rear side of a second embodiment of a cover according to the invention.
Figure 4:
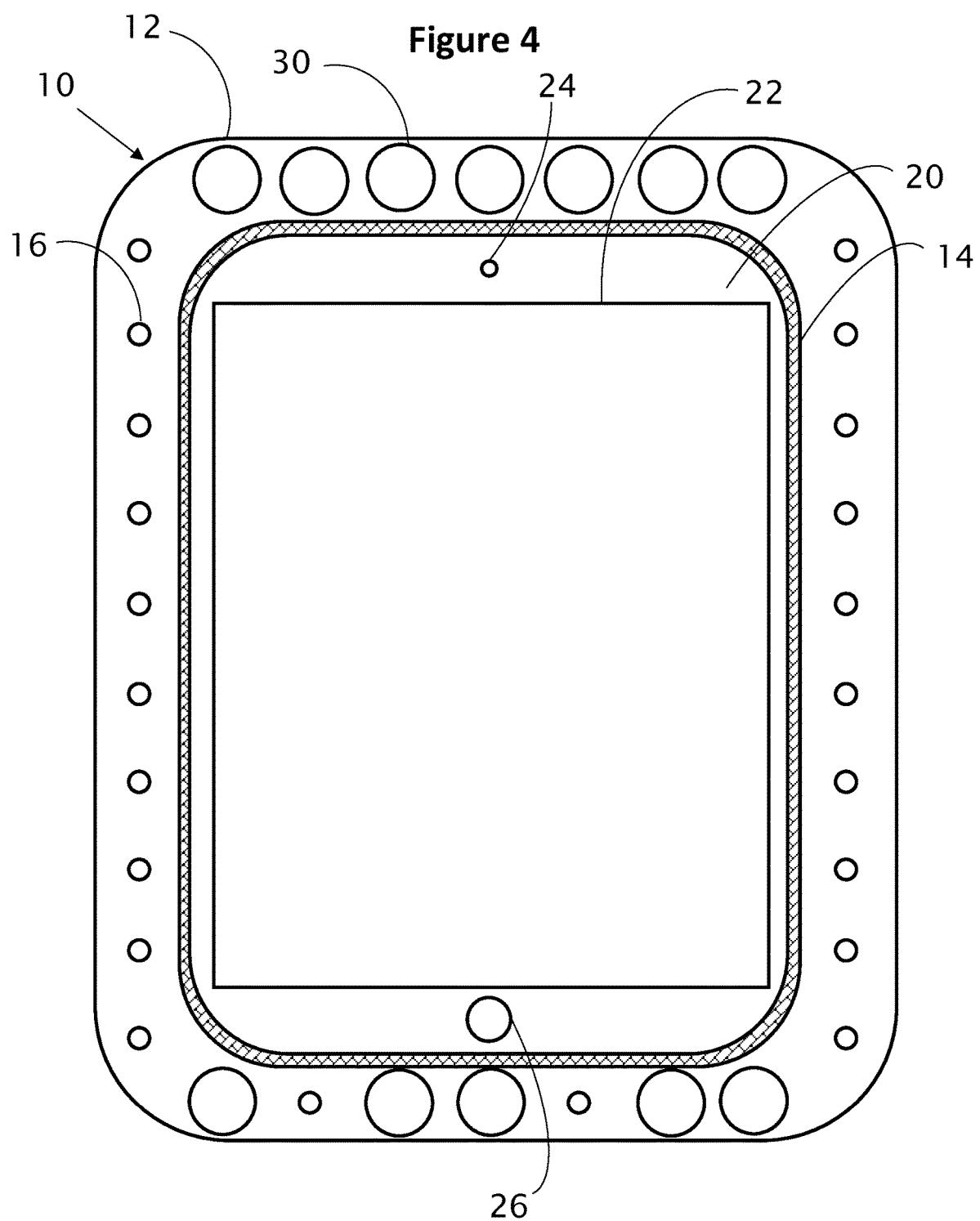
FIG. 4 shows a schematic plan view of the front side of the first embodiment of a cover according to the invention with buttons.
Figure 5:
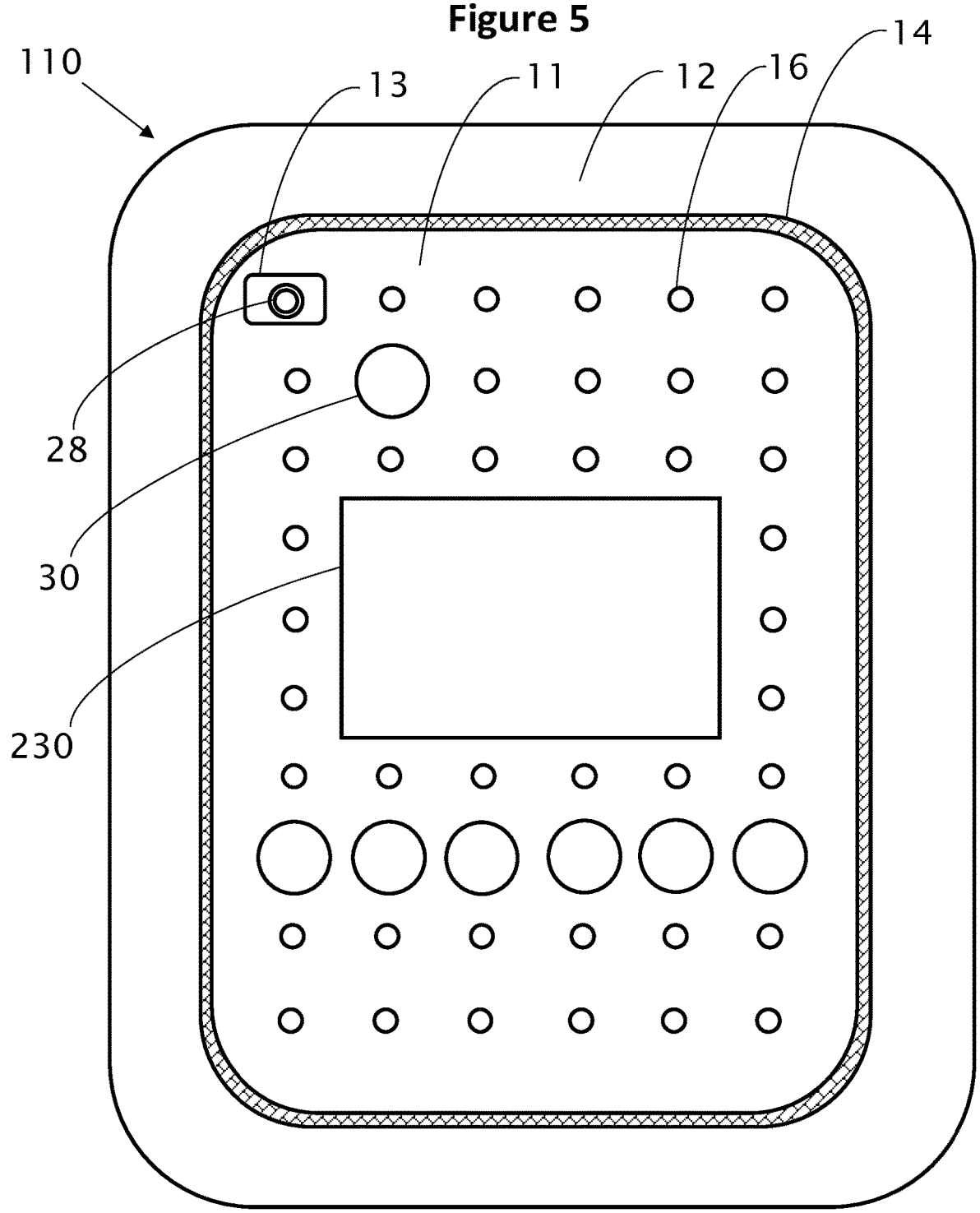
FIG. 5 shows a schematic plan view of the rear side of the second embodiment of a cover according to the invention with buttons.
Figure 8:
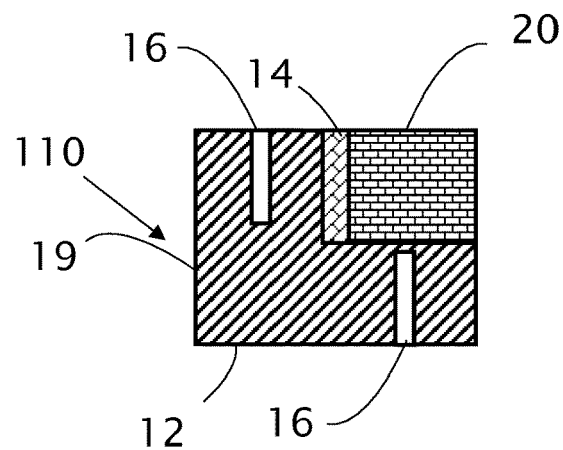
FIG. 8 shows a partial schematic cross-sectional view of a second embodiment of a cover according to the invention.

The cover according to the second embodiment of the invention is indicated generally at 110 on FIGS. 3, 5, and 8 of the drawings. Like features in the second embodiment of the invention to the first embodiment of the invention are identified by like reference numerals. Cover 110 has an outer decorative frame 12 for decoration, an inner frame 14 for resiliently engaging an outer edge of tablet computer 20, and a rear decorative panel 11 for decoration. Tablet computer 20 has a screen 22, a front camera 24, a control button 26 and a rear camera 28.

A plurality of female connectors 16 are formed in outer decorative frame 12 and rear decorative panel 11 for receiving a male connector 32 of a decorative element 30 according to the first embodiment of the invention as shown in FIG. 10. In addition, a plurality of female connectors 16 on rear decorative panel 11 may receive a decorative element 130 which has a plurality of male connectors 32. For example, outer decorative frame 12 may form seven female connectors 16 along its top and bottom frame parts and ten female connectors 16 along the left-hand and right-hand edge frame parts. For example, rear decorative panel has about ten rows of female connectors 16 each row having about six female connectors 16 in it. Rear decorative panel 11 forms an opening 13 for the rear camera 28 of the tablet computer 20. Cover 110 may have one or more formations (not shown) on its outer edge 19 which engage with a button on the tablet computer 20 such as a power button, a volume control button etc.

Figure 6:
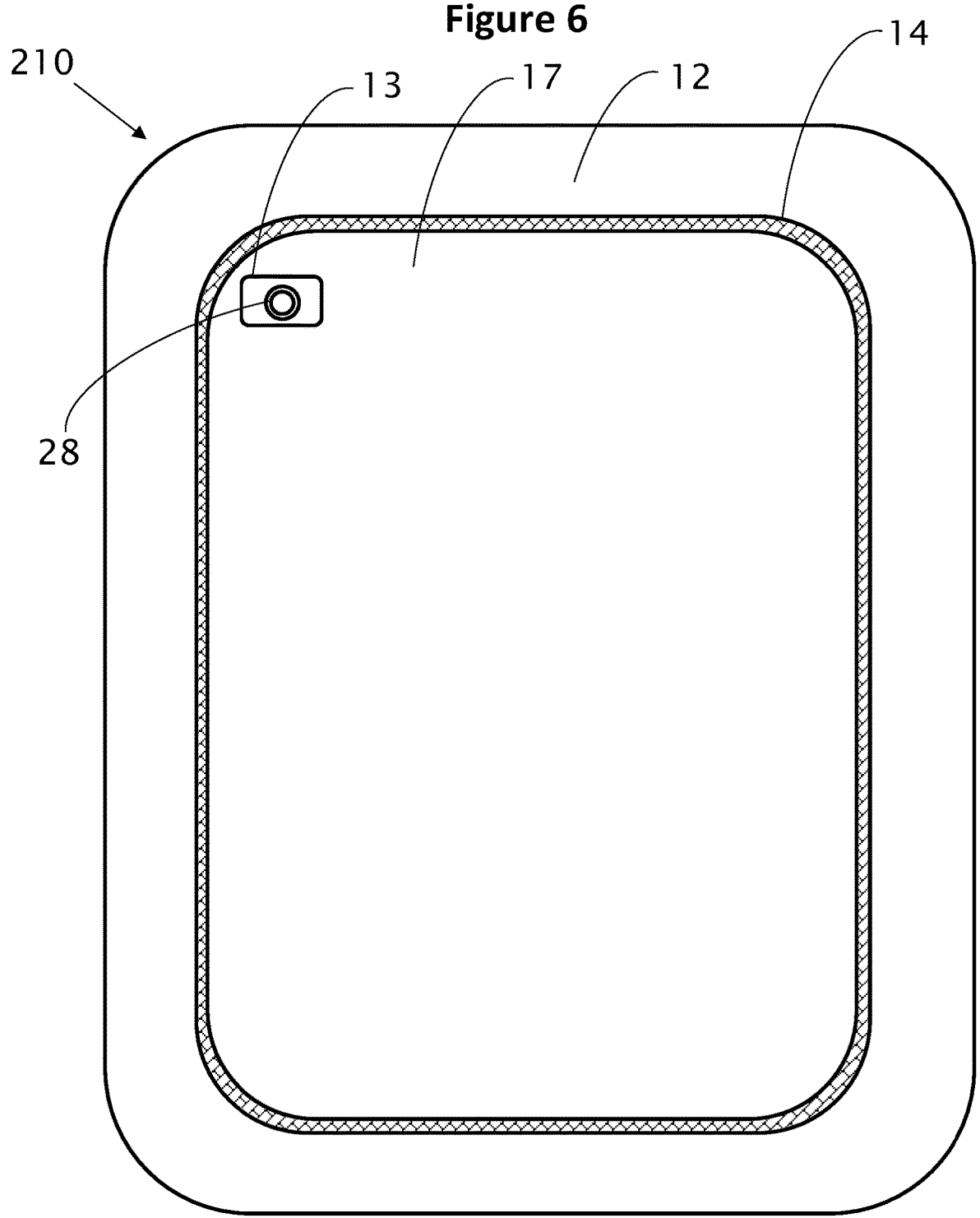
FIG. 6 shows a schematic plan view of a rear side of a third embodiment of a cover according to the invention.
Figure 7:
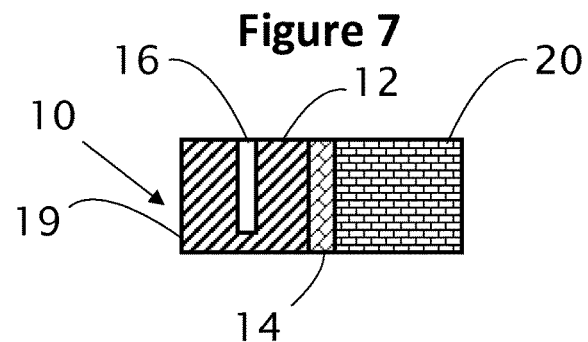
FIG. 7 shows a partial schematic cross-sectional view of a first embodiment of a cover according to the invention.
Figure 9:
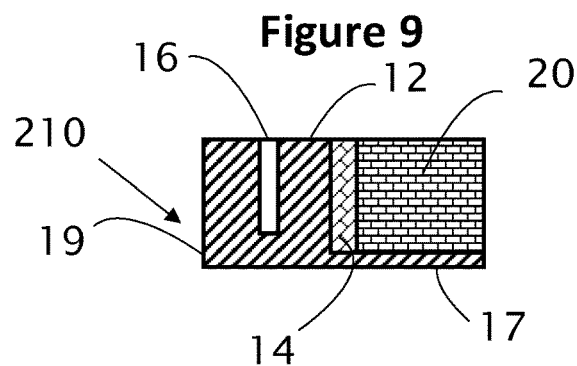
FIG. 9 shows a partial schematic cross-sectional view of a third embodiment of a cover according to the invention.

The cover according to the third embodiment of the invention is indicated generally at 210 on FIGS. 6, and 9 of the drawings. Like features in the second embodiment of the invention to those of the first or second embodiments of the invention are identified by like reference numerals. Cover 210 has an outer decorative frame 12 for decoration, an inner frame 14 for resiliently engaging an outer edge of tablet computer 20, and a rear protective panel 17 for protection. Tablet computer 20 has a screen 22, a front camera 24, a control button 26 and a rear camera 28.

A plurality of female connectors 16 are formed in outer decorative frame 12 for receiving a male connector 32 of a decorative element 30 according to the first embodiment of the invention as shown in FIG. 10. For example, outer decorative frame 12 may form seven female connectors 16 along its top and bottom frame parts and ten female connectors 16 along the left-hand and right-hand edge frame parts. Rear decorative panel 11 forms an opening 13 for the rear camera 28 of the tablet computer 20. Cover 210 may have one or more formations (not shown) on its outer edge 19 which engage with a button on the tablet computer 20 such as a power button, a volume control button etc.

In an alternative embodiment, cover 10, 110, 210 may have an interlocking mechanical connector such as a mushroom-shaped connector (such as 3M (trademark) Dual Lock (trademark) or a hook or loop connector instead of female connector 16. In an alternative embodiment, cover 10, 110, 210 may have a magnetic connector instead of female connector 16. In an alternative embodiment, the outer decorative frame 12 may form a different number of female connectors 16 along its top and bottom frame parts such as 4, 5, 6 or 8 and/or a different number of female connectors 16 along its left-hand and right-hand edge frame parts such as 7, 8, 9, 11 or 12 female connectors, depending upon the size of the decorative elements and/or the size of the tablet computer 20. In an alternative embodiment, the outer decorative frame 12 and inner frame 14 may be combined into a single frame 12. In an alternative embodiment, cover 10, 110, 210 may have a hinged front panel for protecting the screen 22 of the tablet computer 20. In an alternative embodiment, the cover 10, 110, 210 may form an aperture such that a charging socket on the tablet computer 20 may be accessed.

The decorative element according to the first embodiment of the invention is indicated generally at 30 on FIG. 10. Decorative element 30 has a dome-shaped circular decorative head 36 mounted on male connector 32. Decorative head 36 has a diameter of about 1.5 cm. Decorative head 36 may have a colour which is the same as that of the cover 10, 110, 210. Male connector 32 has a shoulder 34 for resiliently engaging female connector 16. Decorative head 36 may be decorated with a letter, symbol, cute animals, plain colour, a nation's flag, clip art, an image of a character from popular culture (such as a film or cartoon character, a singer and/or an actor) and/or with a three-dimensional shape such as synthetic flowers petals and/or a small 3D animal statue.

Figure 11:
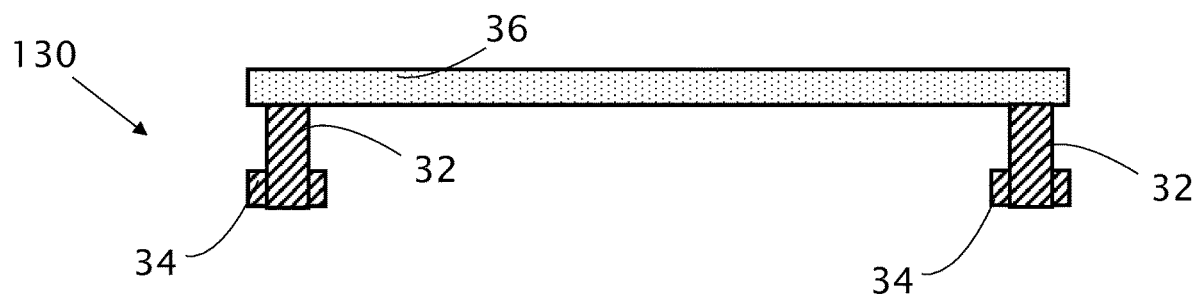
FIG. 11 shows a schematic cross-sectional view of a second embodiment of a decorative element according to the invention.

The decorative element according to the second embodiment of the invention is indicated generally at 130 on FIG. 11. Decorative element 130 has a decorative head 36 having a rectangular shape mounted on four male connectors 32. Like features in the second embodiment of the decorative element according to the invention to those of the first embodiment of the invention are identified by like reference numerals. Each male connector 32 has a cuboid-shaped shoulder 34 for resiliently engaging female connector 16. Decorative head 36 may be decorated with a larger version of the decorative options listed for the decorative head 36 of the first embodiment. Decorative element 130 may be shaped to cover up to the whole of the rear decorative panel 11. For example, decorative element 130 may have from two to six connectors on one side and from two to eleven connectors on its other side.

In an alternative embodiment, decorative elements 30, 130 may have an interlocking mechanical connector such as a mushroom-shaped connector (such as 3M (trademark) Dual Lock (trademark) or a hook or loop connector instead of male connector 32. In an alternative embodiment, decorative element 130 may have two male connectors 32 such that it is a decorative strip element 130 and may cover from two to eleven female connectors. In an alternative embodiment, shoulder 34 may have a polyhedral-, spherical- or ovoid-shape.

The invention claimed is:

1. A cover for a tablet computer having a decorative frame having an inner frame and an outer edge, the decorative frame suitable for being arranged on a front side of the tablet computer wherein the decorative frame forms a plurality of connectors for receiving one or more replaceable decorative elements, the one or more replaceable decorative elements each having at least one corresponding connector, wherein the tablet computer has a screen and the front decorative frame is arranged around the screen of the tablet computer, wherein the one or more decorative elements do not interfere with the functioning of the tablet computer, wherein the plurality of the connectors are provided on the front side of outer decorative frame such that a user of the tablet computer may see the decorative elements, wherein the plurality of connectors are one or more of a female connector, interlocking mechanical connector and/or magnetic connector, optionally to correspond with the at least one connector of the decorative element, wherein the plurality of connectors of the decorative frame are substantially narrower in diameter than a distance between an inner frame and an outer edge such that the female connectors form part of that distance.

2. The cover as defined in claim 1 wherein the cover has an outer decorative frame for decoration and an inner frame for resiliently engaging an outer edge of tablet computer.

3. The cover as defined in claim 1 wherein a decorative element comprises a decorative head mounted on at least one connector.

4. The cover as defined in claim 3 wherein the decorative head is decorated with a letter, symbol, cute animal, plain colour, a nation's flag, clip art, an image of a character from popular culture and/or with a three-dimensional shape.

5. The cover as defined in claim 3 wherein the decorative element has a square, rectangular or abstract shape with a connector provided at each extremity.

6. The cover as defined in claim 3 wherein the at least one connector is a male connector, an interlocking mechanical connector and/or a magnetic connector; preferably the at least one connector is a male connector with a shoulder for resiliently engaging the female connector.

7. The cover as defined in claim 1 wherein the cover has a rear decorative panel in which are formed a plurality of connectors for receiving one or more replaceable decorative elements.

8. The cover as defined in claim 1 wherein the cover has a rear protective panel.

9. The cover as defined in claim 1 wherein the decorative frame has an outer edge and the plurality of connectors are arranged to be approximately equidistant between the inner frame and the outer edge.

10. A cover for a tablet computer including a decorative frame having an inner frame and an outer edge, the decorative frame suitable for being arranged on a front side of the tablet computer wherein the decorative frame forms a plurality of female connectors for receiving one or more replaceable decorative elements; and one or more replaceable decorative elements each having at least one corresponding connector, wherein the tablet computer has a screen and the front decorative frame is arranged around the screen of the tablet computer, wherein the one or more decorative elements do not interfere with the functioning of the tablet computer, wherein the plurality of the female connectors are provided on the front side of outer decorative frame such that a user of the tablet computer may see the decorative elements, wherein the plurality of female connectors are substantially narrower in diameter than a distance between an inner frame and an outer edge such that the female connectors form part of that distance.

* * * * *